(12) United States Patent
Aradhye et al.

(10) Patent No.: US 7,738,706 B2
(45) Date of Patent: Jun. 15, 2010

(54) METHOD AND APPARATUS FOR RECOGNITION OF SYMBOLS IN IMAGES OF THREE-DIMENSIONAL SCENES

(75) Inventors: Hrishikesh Aradhye, Mountain View, CA (US); Gregory K. Myers, San Francisco, CA (US)

(73) Assignee: SRI International, Menlo Park, CA (US)

(*) Notice: Subject to any disclaimer, the term of this patent is extended or adjusted under 35 U.S.C. 154(b) by 1537 days.

(21) Appl. No.: 11/027,846

(22) Filed: Dec. 30, 2004

(65) Prior Publication Data
US 2005/0180632 A1    Aug. 18, 2005

Related U.S. Application Data

(63) Continuation-in-part of application No. 09/895,868, filed on Jun. 29, 2001, now Pat. No. 7,031,553.

(60) Provisional application No. 60/234,813, filed on Sep. 22, 2000.

(51) Int. Cl.
*G06K 9/18* (2006.01)
*G06K 9/00* (2006.01)
*G06K 9/40* (2006.01)

(52) U.S. Cl. .................. 382/182; 382/105; 382/154

(58) Field of Classification Search .............. 382/105, 382/143, 144, 147, 154, 173, 174, 176, 181, 382/202, 229, 290, 295, 296, 254, 260–264, 382/274–275
See application file for complete search history.

(56) References Cited

U.S. PATENT DOCUMENTS

| | | | | |
|---|---|---|---|---|
| 4,817,166 A | * | 3/1989 | Gonzalez et al. | 382/105 |
| 5,557,689 A | * | 9/1996 | Huttenlocher et al. | 382/177 |
| 5,651,075 A | * | 7/1997 | Frazier et al. | 382/105 |
| 5,764,383 A | * | 6/1998 | Saund et al. | 358/497 |
| 6,094,501 A | * | 7/2000 | Beatty | 382/154 |
| 6,400,848 B1 | * | 6/2002 | Gallagher | 382/254 |
| 6,473,517 B1 | * | 10/2002 | Tyan et al. | 382/105 |
| 6,473,522 B1 | * | 10/2002 | Lienhart et al. | 382/168 |
| 6,603,885 B1 | * | 8/2003 | Enomoto | 382/263 |
| 7,031,553 B2 | * | 4/2006 | Myers et al. | 382/289 |
| 7,333,676 B2 | * | 2/2008 | Myers et al. | 382/289 |

OTHER PUBLICATIONS

Y. Watanabe, Y. Okada, Y. Kim, T. Takeda, "Translation Camera," 14th International Conference on Pattern Recognition (ICPR'98)-vol. 1, 1998, pp. 613-617.

* cited by examiner

*Primary Examiner*—Amir Alavi

(57) ABSTRACT

An apparatus and a concomitant method for rectification and recognition of symbols (e.g., to correct for the effects of perspective distortion, rotation and/or scale) in images of three-dimensional scenes is provided. The present method locates a reference region lying in a common plane with a symbol to be recognized, where the reference region represents an image of a planar object having assumed (e.g., known or standard) geometry and dimensions, along with at least four easily detectable correspondence points within that geometry. An image of the common plane is then rectified in three dimensions in accordance with the assumed dimensions of the reference region in order to produce a transformed (e.g., rectified) image of the symbol, which is significantly easier to recognize than the original imaged appearance of the symbol using existing recognition methods.

24 Claims, 11 Drawing Sheets

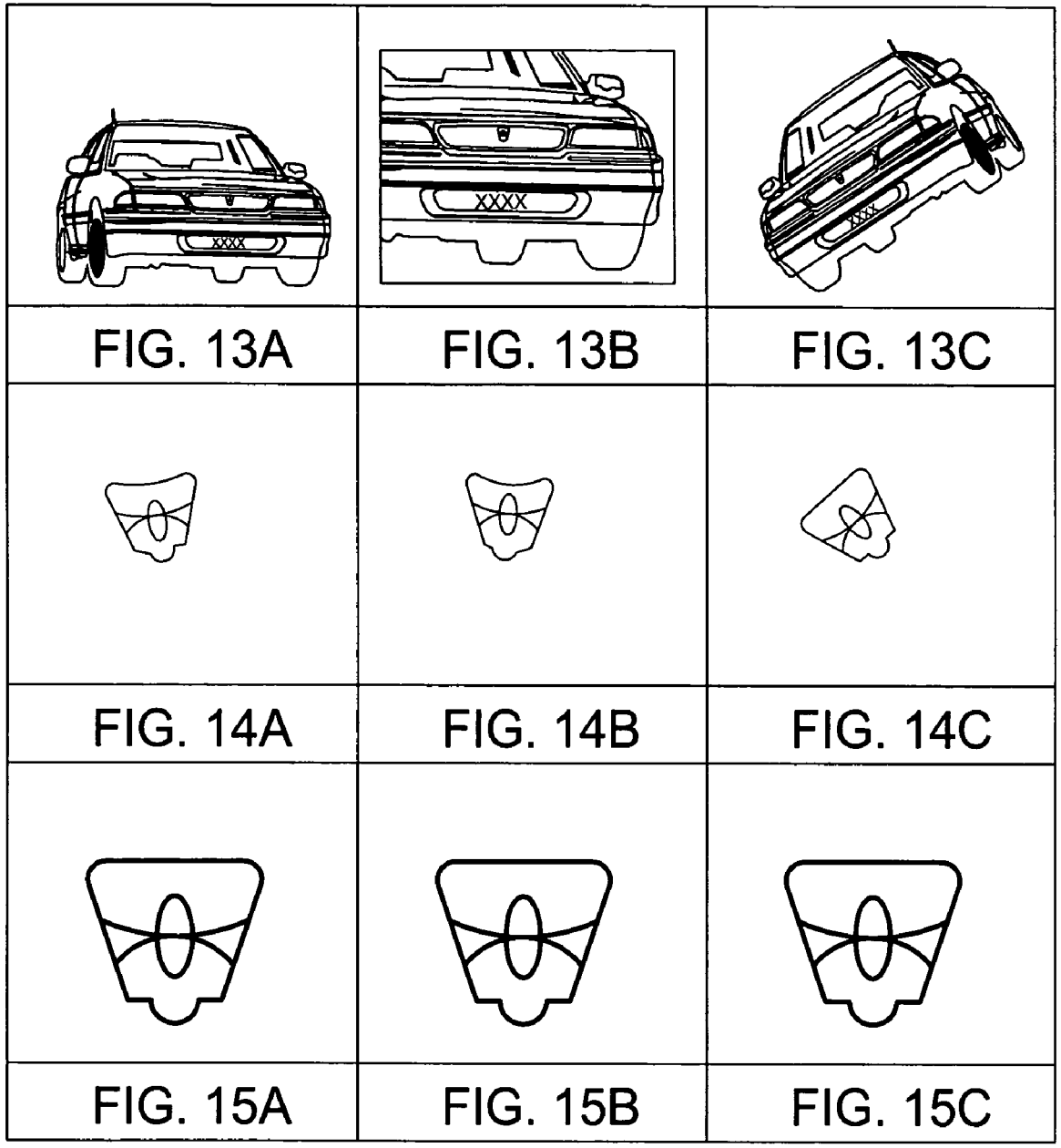

METHOD AND APPARATUS FOR RECOGNITION OF SYMBOLS IN IMAGES OF THREE-DIMENSIONAL SCENES

CROSS REFERENCE TO RELATED APPLICATIONS

This application is a continuation-in-part of U.S. patent application Ser. No. 09/895,868, filed Jun. 29, 2001, now U.S. Pat. No. 7,031,553 which in turn claims the benefit of U.S. Provisional Application Ser. No. 60/234,813 filed on Sep. 22, 2000, both of which are herein incorporated by reference.

FIELD OF THE INVENTION

The present invention relates to an apparatus and concomitant method for digital image processing. More specifically, the present invention provides symbol rectification, scaling and recognition in an image or a sequence of scene imagery, e.g., three-dimensional (3D) scenes of the real world.

BACKGROUND OF THE DISCLOSURE

Digital still cameras and digital video cameras permit imagery to be stored and displayed for human viewing. However, the captured digital imagery contains information that, if automatically extracted, could be used for other purposes. Information about real-world scenery imaged by the camera, such as text (e.g., words and symbols) appearing in the scene, could then be processed and/or disseminated by new computing-based applications.

For example, automatic characterization of automobiles (e.g., for security purposes) could be enhanced by providing a means of recognizing symbols, such as manufacturer's insignia or logos, in a captured image of an automobile (e.g., in addition to providing automatic recognition of the license plate number). That is, by recognizing symbols in the image, more information about an automobile in question can be obtained (e.g., a description such as, "a white Toyota Corolla with the license plate number XYZ123" provides more information than the description, "a white car with the license plate number XYZ123"). Similarly, symbol recognition could enhance characterization of documents such as business cards or stationery, which may include corporate logos.

Research in text and symbol recognition for both printed documents and other sources of imagery has generally assumed that the text and symbols lie in a plane that is orientated roughly perpendicular to the optical axis of the camera and has also assumed that the text is roughly parallel to the horizontal edge of the imaging frame. However, text and symbols printed on objects such as street signs, license plates, business cards and billboards appearing in captured video imagery often: (a) lie in planes that are orientated at oblique angles; (b) are rotated; and/or (c) are scaled, and therefore may not be recognized very accurately by conventional optical character recognition (OCR) or symbol recognition methods. Therefore, a need exists in the art for an apparatus and method to take advantage of 3-D scene geometry to detect distortions including: (a) the perspective orientations of the planes on which text and symbols are printed; (b) the rotation angles of the text and symbols in those planes; and (c) a scale or zoom factor, thereby improving text and symbol recognition. For the purposes of the present invention, the term "rectification" refers to the removal of the effects of some or all of the distortion factors discussed above from an image or sequence of three-dimensional scene imagery.

SUMMARY OF THE INVENTION

An apparatus and a concomitant method for rectification and recognition of symbols (e.g., to correct for the effects of perspective distortion, rotation and/or scale) in images of three-dimensional scenes is provided. The present method locates a reference region lying in a common plane with a symbol to be recognized, where the reference region represents an image of a planar object having assumed (e.g., known or standard) geometry and dimensions, along with at least four easily detectable correspondence points within that geometry. An image of the common plane is then rectified in three dimensions in accordance with the assumed dimensions of the reference region in order to produce a transformed (e.g., rectified) image of the symbol, which is significantly easier to recognize than the original imaged appearance of the symbol using existing recognition methods.

BRIEF DESCRIPTION OF THE DRAWINGS

The teachings of the present invention can be readily understood by considering the following detailed description in conjunction with the accompanying drawings, in which:

FIGS. 13a-13c illustrate example scales and orientations of the rear plane of an automobile, e.g., including a license plate and a manufacturer's insignia;

FIGS. 14a-14c illustrate the manufacturer logos, in their original orientations, corresponding to the rear planes of the automobile depicted in FIGS. 13a-13c; and FIGS. 15a-15c illustrate the corresponding results obtained when applying the method of FIG. 12 to recognize the manufacturer insignia on the rear plane of the automobile depicted in FIGS. 13a-13c.

To facilitate understanding, identical reference numerals have been used, where possible, to designate identical elements that are common to the figures.

DETAILED DESCRIPTION

Figure 1:
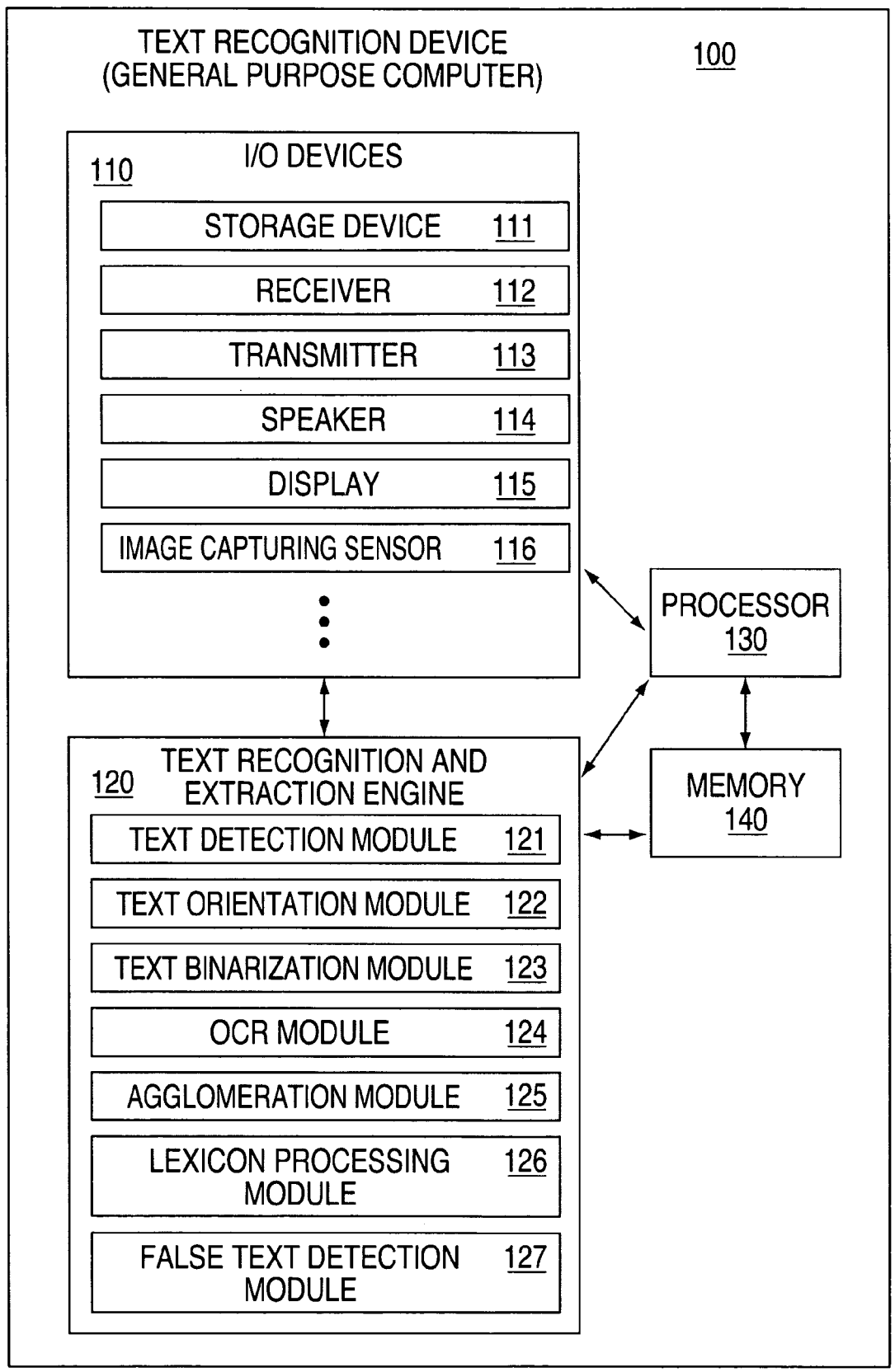
FIG. 1 illustrates a block diagram of one embodiment of a text recognition system according to the present invention.

FIG. 1 illustrates a block diagram of one embodiment of a text recognition device or system 100 according to the present invention. As used herein, the term "text" means letters, numbers, words, symbols and any other character (e.g., alphanumeric or other characters) or combination of characters that may, if recognized, provide information about or identification of a person, place or object. In one embodiment, the text recognition device or system 100 is implemented using a general purpose computer or any other hardware equivalents. Although in one embodiment the recognition device or system 100 is implemented as a portable device, it should be noted that the present invention can also be implemented using a larger computer system, e.g., a desktop computer or server.

Thus, in one embodiment, the text recognition device or system 100 comprises a processor (CPU) 130, a memory 140, e.g., random access memory (RAM) and/or read only memory (ROM), a text recognition and extraction engine 120, and various input/output devices 110, (e.g., storage devices 111, including but not limited to, a tape drive, a floppy drive, a hard disk drive or a compact disk drive, a receiver 112, a transmitter 113, a speaker 114, a display 115, an image capturing sensor 116, e.g., digital still camera or video camera, a keyboard, a keypad, a mouse, and the like).

It should be understood that the text recognition and extraction engine 120 can be implemented as physical devices that are coupled to the CPU 130 through a communication channel. Alternatively, the text recognition and extraction engine 120 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 140 of the computer. As such, the text recognition and extraction engine 120 (including associated methods and data structures) of the present invention can be stored on a computer readable medium, e.g., RAM memory, magnetic or optical drive or diskette and the like.

In one embodiment, the text recognition and extraction engine 120 comprises a text detection module 121, a text orientation module 122, a text binarization module 123, an optical character recognition (OCR) module 124, an agglomeration module 125, a lexicon processing module 126, and a false text detection module 127. In operation, the text recognition and extraction engine 120 is able to accurately detect and extract text information from an input image or video imagery. A detailed description of the functions of the text recognition and extraction engine 120 is disclosed below with reference to FIG. 2. The text results from the text recognition and extraction engine 120 are then provided to the processor 130 for further processing to provide various functionalities or services. These functionalities or services include, but are not limited to, automatic text recognition with audio playback or visual display (e.g., license plates, street signs, placards, restaurant menus, billboards, white boards, labels, business cards, identification cards or books), automatic text translation to a foreign language, automatic access to auxiliary information, automatic road sign reading for navigation, automatic license plate reading for law enforcement functions, image and video indexing and archiving and inventory and shelf restocking control. Examples of such portable text recognition devices are disclosed in commonly assigned U.S. patent application Ser. No. 09/897,786 filed Jun. 29, 2001, which is herein incorporated by reference in its entirety.

Figure 2:
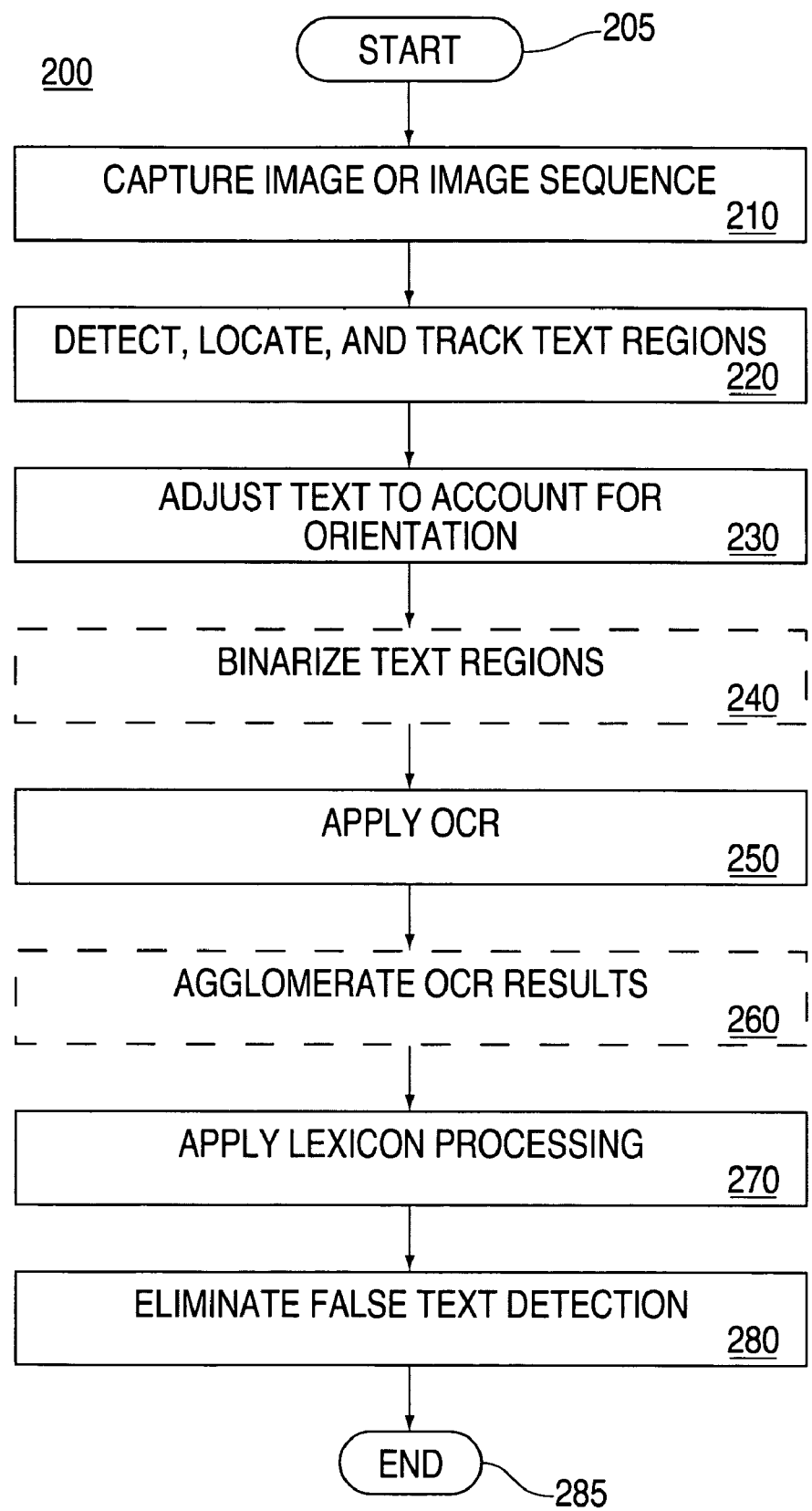
FIG. 2 illustrates one embodiment of a method of text recognition and extraction in accordance with the text recognition system of the present invention.

FIG. 2 illustrates one embodiment of a method 200 for text recognition and extraction in accordance with the present invention. Specifically, the method is designed for detecting and reading text appearing in video or still imagery. This invention is concerned with reading text that is in the scene itself (such as a sign on a building). However, the present techniques could also be applied to computer-generated text caption overlays (such as that which appears in broadcast news videos). The system 100 of FIG. 1 employing method 200 can accept a video or still image signal and recognize text in real time. It should be noted that the term "captured imagery" in the present application may encompass, in part or in whole, a still image and/or an image sequence.

Method 200 starts in step 205 and proceeds to step 210, where an image or an image sequence (e.g., video) is captured. In one embodiment, the image or image sequence is captured via conventional equipment e.g., image capturing sensor 116 (e.g., digital still camera or digital video camera). Alternatively, step 210 can be omitted if the captured imagery was previously captured and is simply being retrieved from a storage device 111.

In step 220, method 200 detects, locates, and tracks text regions within the captured imagery. In one embodiment, any known method for detecting, locating and/or tracking text regions can be implemented in step 220. In one particular embodiment, method 200 approaches text detection and location with the assumption that the text is roughly horizontal, and that the characters have a minimum contrast level compared with the image background. The text may be of either polarity (light text on a dark background, or dark text on a light background). Thus, in one embodiment, the method 200 first detects vertically oriented edge transitions in the grayscale image, using a local neighborhood edge operator. The output of the operator is thresholded to form two binary images, one for dark-to-light transitions (B1), and the other for light-to-dark transitions (B2). A connected components algorithm is then applied on each binary image. The connected components that are determined (by examining their height and area) to be not due to text are eliminated. The remaining connected components are linked to form lines of text by searching the areas to the left and right of each connected component for additional connected components that are compatible in size and relative position. Finally, a rectangle is fitted to each line of detected text or a group of lines of text using the moments of all connected components used to locate the text.

In one embodiment, the detected text is tracked over multiple consecutive video frames. This can be achieved, for example, by computing the frame-to-frame displacement of the pixels in a set of local neighborhoods, or finding and following distinctive shape features, such as the ends of character strokes, and then computing a geometric transformation that characterizes the frame-to-frame displacement of corresponding text regions.

Figure 4:
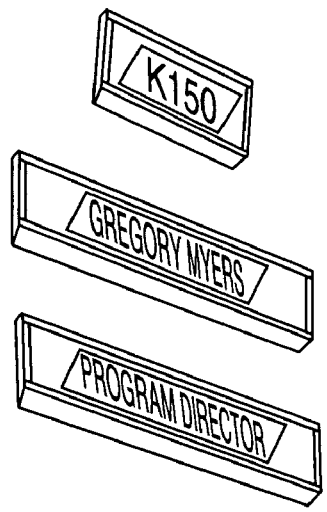
FIG. 4 illustrates text that appears to be rotated in the image plane.

Returning to FIG. 2, in step 230, method 200 adjusts detected text to account for orientation. Namely, text in a captured imagery is often viewed from an oblique angle as shown in FIG. 4 below. Such a configuration is quite common when the main subject of the scene is not the text itself, but such incidental text could be quiet important (for example, it may be the only clue of the location of the captured imagery). Thus, method 200 applies a processing step in step 230 to account for text orientation, thereby improving the recognition method that will be applied at a later processing stage to recognize the detected text. One embodiment of a method for adjusting the detected text is described in greater detail below.

In one embodiment, the method 200 proceeds to optional step 240 (illustrated in phantom), where the method 200 binarizes the detected text regions. In one embodiment, binarization is performed on each text line independently. It is assumed that the text pixels are relatively homogeneous, and that the intensity of the background pixels may be highly variable. For each text line, the polarity of text is first determined, and then binarization of the text line is performed.

In one embodiment, the polarity is determined by comparing grayscale pixel values above and below the baselines. This relies on the assumption that inside pixels (those below the top and above the bottom baselines) are most likely character pixels and the outside pixels (those above the top and below the bottom baseline) are most likely background pixels. The polarity calculation compares pairs of pixels along both baselines and sums the number of times the inside pixel is greater than the outside pixel. If this sum is greater than zero, the polarity is determined to be light text on a dark background; otherwise, the polarity is determined to be dark text on a light background.

In one embodiment of a binarization method, the grayscale image is smoothed with a Gaussian kernel, and histograms H1 and H2 are computed. Histogram H1 is composed of gray-scale pixels in the smoothed image on the right side of the connected components in the dark-to-light edge transition image B1 and on the left side of the light-to-dark edge transition image B2. If light text is in this text region, these are the pixels most likely to belong to light text or near the edge of light text. Similarly, histogram H2 is composed of gray-scale pixels in the smoothed image on the right side of the connected components in image B2 and on the left side of the image B1. The threshold for the text line is then set to the gray value at the $60^{th}$ percentile of histogram H1 or H2, depending on the polarity chosen. Alternatively, more than one binarizaton result for each text line is produced, each using a different threshold value (e.g., 45th percentile, 60th percentile, and 75th percentile). Producing more than one binarization result, and sending them through the recognition process (Step 250) can, after combining the recognition results with agglomeration (Step 260), sometimes yield more accurate results than processing a single binarization result.

Returning to FIG. 2, in step 250, method 200 applies recognition processing (e.g., optical character recognition—OCR—or other recognition processing) to the binarized text regions. In one embodiment, step 250 is achieved by using a commercially available OCR engine, e.g., an OCR package from Scansoft, Inc. of Peabody, Mass. However, it should be noted the present invention is not so limited and that other OCR packages may also be used. It should be noted that some OCR engines operate on a gray-scale imagery instead of binary images and therefore would not require the binarization processing in step 240. The OCR engine produces one or more candidate identities for each recognized text character in the image, rank-ordered according to likelihood.

In optional step 260 (illustrated in phantom), method 200 agglomerates the OCR results. In embodiments where the method 200 is implemented for video text recognition, the method 200 will typically involve performing recognition processes (e.g., in accordance with step 250) on images derived from individual video frames. However, in many applications the same text persists in the scene for some length of time. Digitized video frames of the same scene may vary slightly, thereby causing a recognition process operating on individual frames to produce slightly different results. Therefore, method 200 combines ("agglomerates") OCR results from multiple frames, in a manner that takes the best recognition results from each frame and forms a single result. The use of agglomeration improves the recognition accuracy over that of the OCR results on individual images. It also enables the system to avoid outputting the same results repeatedly when the text is persistent in the video sequence for many frames, and reduces the generation of false characters from non-text image regions. In addition, because the agglomeration process works on OCR results (as opposed to image pixels) from multiple frames, it is computationally fast enough to implement in a real-time system (i.e., one that keeps up with the video display rate).

In general, method 200 uses the frame-to-frame displacement determined in step 220 to find character-to-character correspondence between OCR results in multiple consecutive frames. The agglomeration process selects the most likely character identity in each set of corresponding characters, and therefore the combined result will tend to be more accurate than any of the results from the individual frames.

Specifically, the input to this process is a series of output structures (one for each processed frame) from an OCR engine which produces multiple candidate identities for each recognized text character in the image rank-ordered according to likelihood. A confidence value or probability is associated with the top-ranked character, each of the other candidate characters may also have a confidence value or probability. The output is a series of similar structures, except that a start time (when it first appeared) and an end time (when it disappeared from the image) is associated with each character, word, and line.

The general approach is to successively update an agglomeration ("agg") structure with the OCR results from each video frame as they become available from the OCR engine. The agglomeration process can produce output in different modes of output: (1) output the agglomerated OCR results after every processed frame; (2) output the agglomerated OCR results only when there is a change in the text content of the scene; or (3) output individual text segments from the agglomerated structure immediately after those text segments have disappeared from the video sequence.

Since the segmentation of text lines may vary from frame to frame (because of changes in the scene, or because of slight variations the digitization of the same scene), there may not be a one-to-one correspondence between text lines in successive frames. For example, a line in one frame could overlap two different lines in another frame. In addition, from one frame to the next, the contents of a line of text may change, or characters may be added to a line of text. Therefore, the present approach looks for frame-to-frame changes based on a "character group" structure instead of on a line-by-line basis. A character group is defined as a group of consecutive characters in a text line that each overlap one or more characters in another frame.

In general, any agglomeration technique could be implemented in step 260. For example, one embodiment of an appropriate agglomeration technique is presented below:

$\{O_t\}$ is the set of OCR results for each frame t. $O_t$ is a hierarchical structure consisting of a set of lines $\{L_i\}$. Each line has a set of character slots, and each slot has one or more candidate character identities.

$\{L_i\}$ i=1 . . . I is the set of lines of OCR results in the agglomerated ("agg") structure $\{L'_i\}$ i=1 . . . I' is the set of lines of OCR results from the current ("curr") video frame $\{LP_j\}$ j=1 . . . J is the set of (agg, curr) line pairs that overlap $\{T_j\}$ j=1 . . . J is the set of geometrical transforms associated with each $LP_j$ A character group pair $CGP_k = \{\{CG_k\}, \{CG'_k\}\}$, where $CG_k$ are consecutive character slots that overlap one or more character slots in $CG'_k$, and $CG'_k$ are consecutive character slots that overlap one or more character slots in $CG_k$. There are five types of correspondences between character slots: 1:1, splits, merges, unaligned, and unmatched.

For each new frame t the algorithm operates as follows:

Step 1. From the two set of lines $\{L_i\}$ and $\{L'_i\}$ find pairs of overlapping lines $\{LP_j\}$ and their associated geometrical transform $\{T_j\}$. This step finds the correspondence between text regions in $A_t$ and $O_t$ by one or more methods: (a) assuming that the position of the text in the image does not change from frame to frame, test the overlap of bounding boxes of the text lines; (b) tracking various pixel data or characteristics of text regions that move from frame to frame (as in Step 220); and (c) matching text regions across frames by the identity of their recognized characters, and then computing the geometrical transform between those that match.

Step 2. For each of the line pairs $LP_j$ and its associated geometrical transform $T_j$ find character group pairs $CGP_k$, $k=1, \ldots K_j$. This step computes character-to-character correspondences by comparing the positions of the left and right sides of the bounding boxes of the character slots. Even when text is stationary in the image, this step permits a small amount of uncertainty in character position due to video capture jitter and differences in character segmentation by the OCR engine.

Step 3. Conditionally update each $CGP_k$:

3A. If curr text $CG'_k$ is new (different than the corresponding agg text $CG_k$ but in the same image position), and put $CG_k$ on the to-be-replaced list and mark it for output. If both character groups $CG'_k$ and $CG_k$ have a high average confidence and few 1:1 correspondences, or if both character groups have high-confidence characters in 1:1 correspondence that differ radically (i.e., not 0/O, 1/I, etc.), then the text in $CG'_k$ is deemed different than the text in $CG_k$, and should be replaced.

3B. Else if $CG'_k$ is significantly better (as judged by average confidence value or probability) than $CG_k$, replace all the characters in $CG_k$ with the characters in $CG'_k$ 3C. Else update each 1:1, split, merge, and unaligned character slot in $CG_k$ with the corresponding character slot in $CG'_k$ if the latter character slot is significantly better (as judged by average confidence value or probability).

Step 4. Mark text in the agg structure $A_t$ that is not in the curr structure $O_t$ as deletions.

Step 5. Mark text in the curr structure $O_t$ that is not in the agg structure $A_t$ as insertions.

Step 6. Update the agg structure A, with the text marked for replacement, deletion, and insertion. This step updates the characters in $CG_k$ with the characters in $CG'_k$ based on two criteria: the confidence value or probability of each character identity, and frequency count (the number of frames in which each character is present in the OCR results).

Step 7. Output any part of the agg structure $A_t$ that should be output at time t.

As discussed above, the agglomeration process can operate in different output modes: (1) output the entire agglomerated OCR results after every processed frame; (2) output the agglomerated OCR results only when there is a change in the text content of the scene; or (3) output individual text segments from the agglomerated structure immediately after those segments have disappeared from the video sequence. For output modes 1 and 2, Step 6 would be executed before Step 7; for output mode 3, Step 7 would be executed before Step 6.

In another embodiment of a suitable agglomeration technique, the text detection and tracking process 220 forms line sequences; each line sequence corresponds to a single instance of a line of text that appears in multiple images or frames. The OCR results derived from a line sequence are represented by $S_t$, $t=1, 2, \ldots T$, where T is the number of frames in the sequence. To agglomerate a line sequence, Steps 2 through 6 are run T times; in each run $S_t$ is treated as the "curr" structure. Step 1 is not executed, and Step 7 is executed after agglomerating the last line $S_T$ of the line sequence. This alternate form of agglomeration can also be used to combine multiple OCR results for the same text line appearing in the same frame (obtained after binarizing the same line of text multiple times with different threshold settings, as described in step 240).

Returning to FIG. 2, in step 270, method 200 applies lexicon processing. In one embodiment, step 270 is achieved by first choosing hypothesized word identities from a lexicon that contain character substrings found in the OCR results produced by step 260. The process then selects the most likely hypothesized words by comparing their characters with the OCR results (including lesser-ranked candidate character identities).

Finally, in step 280, method 200 eliminates false text (i.e., text that is likely to be caused by graphic or other non-text elements in the image). In one embodiment, false text is detected by at least one of a number of potential criteria, such as low confidence, brief time appearing in the imagery, and combinations of characters (especially non-alphabetic) within a word that occur infrequently (e.g., "[ ]Cz-13q").

One important aspect of the present invention is the ability to recognize scene text, such as text printed on street signs, name plates, and billboards, that is part of the video scene itself. Many text recognition efforts in video and still imagery have assumed that the text lies in a plane that is oriented roughly perpendicular to the optical axis of the camera. Of course, this assumption is valid for scanned document images and imagery containing overlaid text captions, but is not generally true for scene text. In fact, text information is often viewed from an oblique angle. Such a configuration is quite common when the main subject of the scene is not the text itself, but such incidental text could be quiet important (for example, it may be the only clue of the location of the captured imagery).

Figure 3:
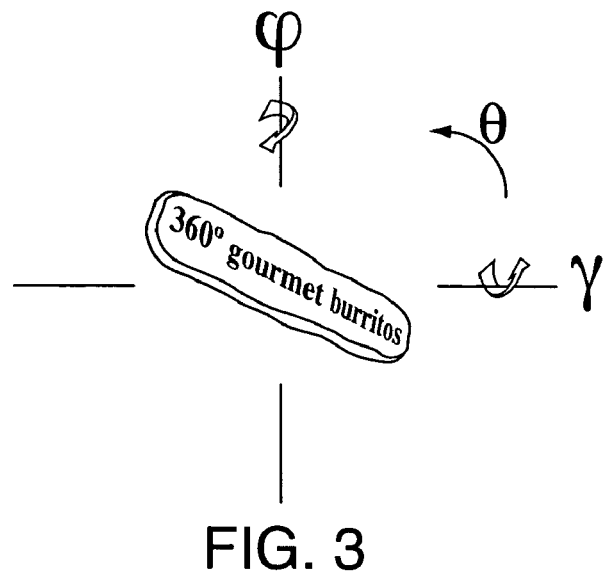
FIG. 3 illustrates the orientation angle of text relative to a camera can be modeled in terms of three angles.

To address the problem of recognizing text that lies on a planar surface in 3-D space, one should note that the orientation angle of such text relative to the camera can be modeled in terms of three angles, as shown in FIG. 3:

$\theta$, the rotation in the plane perpendicular to the camera's optical axis $\phi$ and $\gamma$, the horizontal (azimuth) and vertical (elevation) components, respectively, of the angles formed by the normal to the text plane and the optical axis.

Figure 5:
FIG. 5 illustrates characters becoming sheared after in-plane rotation.

The three angles represent the amount of rotation that the text plane must undergo relative to the camera in each of its three axes to yield a frontal, horizontal view of the plane in the camera's field of view. When $\theta$ and $\gamma$ are zero and $\phi$ is nonzero, the apparent width of the text is reduced, resulting in a change in aspect ratio and a loss of horizontal resolution. Similarly, when $\theta$ and $\phi$ are zero and $\gamma$ is nonzero, the text appears to be squashed vertically. The severity of perspective distortion is proportional to D/Z, where D is the extent of the text parallel to the optical axis (its "depth") and Z is the distance from the text to the camera. When the text is not centered at the optical axis or both $\phi$ and $\gamma$ are nonzero, the text appears to be rotated in the image plane (see FIG. 4). If the text were rotated to remove this apparent angle by a text recognition process that mistakenly assumed the text is fronto-parallel, the characters would become sheared (see FIG. 5). When both $\phi$ and $\gamma$ are nonzero and perspective distortion is significant, the shearing angle varies from left to right within the text region. OCR engines perform poorly if the shearing causes characters to touch or to be severely kerned (overlapped vertically).

When the plane that contains the text is at an angle relative to the image plane, several types of distortions can be introduced that make it difficult to read the text. In the most general case, the distortion is described as a projective transformation (or homography) between the plane containing the text and the image plane. The present invention can correct this distortion by applying the appropriate "corrective" projective transformation to the image. That is, the present method can rotate and stretch the original image to create a synthetic image, which is referred to as a "rectified image," in which the projective distortion has been removed.

In general, a two-dimensional projective transformation has eight degrees of freedom. Four correspond to a Euclidean two-dimensional transformation (translations along two axes $t_x$ and $t_y$, a rotation r, and an isotropic scale factor s); two correspond to an affine transformation (a shear a and a nonisotropic scaling b of one axis relative to the other); and the remaining two degrees of freedom represent a perspective foreshortening along the two axes $f_x$ and $f_y$.

From an OCR point of view, some of the eight parameters produce changes that are harder to handle than others. In particular, the two translations are typically not a problem, because they simply produce an image shift that is naturally handled by OCR systems. Similarly, the two scale factors are typically not a problem, because the OCR systems typically include mechanisms to work at multiple scales. The Euclidean rotation is important, but is typically easily computed from a line of text. Therefore, three critical parameters produce distortions that are difficult for OCR systems to handle: the two perspective foreshortening parameters and the shearing.

In one embodiment of the present approach, estimates of the plane parameters are computed from the orientations of the lines of text in the image and the borders of planar patch, if they are visible. To remove a projective distortion, the present invention computes the three critical degrees of freedom associated with the plane on which the text is written. In general, the present invention can accomplish this task by identifying three geometric constraints associated with the plane. For example, one can compute the necessary parameters, given two orthogonal pairs of parallel lines, such as the borders of a rectangular sign or two parallel lines of text and a set of vertical strokes within the text. The three constraints derivable from these sets of lines are two vanishing points (one from each set of parallel lines) and an orthogonality constraint between the set of lines.

Sometimes, however, such linear properties are difficult to detect. In such cases, the present invention can estimate the parameters by making assumptions about the camera-to-plane imaging geometry that are often true. For example, people normally take pictures so that the horizon is horizontal in the image. In other words, they seldom rotate the camera about its principal axis. In addition, they often keep the axis of the camera relatively horizontal. That is, they do not tilt the camera up or down very much. When these two assumptions apply and the text lies on a vertical plane, such as a wall of a building or a billboard, the projective distortion is only along the X axis of the image. The perspective foreshortening in that direction can be computed from one constraint, such as a pair of horizontal parallel lines.

Another assumption that often holds is that the perspective effects are significantly smaller than the effects caused by the out-of-plane rotations. This is the case if the depth variation in the text is small compared with the distance from the camera to the plane. In this case, the perspective distortion is reduced to an affine shear and the projection is described as a weak perspective projection.

Given these relationships, the general strategy is to identify as many properties of a region of text as possible, and then compute a corrective transformation, using as few assumptions as possible. Initially, the present invention uses information derived independently from each individual line of text. Next, the present invention combines information from multiple text lines after partitioning them into sets of lines that lie within a common plane. The method then further augments the process by detecting auxiliary lines that can provide horizontal and vertical cues. These can include lines in the same plane as the text (such as sign borders), and extraneous lines (e.g., building edges). Finally, depending upon the success in finding these features, one can either make assumptions to substitute for missing constraints (and then compute a transformation that corrects for a full perspective projection) or compute a transformation that does not completely remove all degrees of freedom.

In one embodiment, each text line is rectified in a single image independently. After possible lines of text are detected, various features of each text line are then estimated. These include the top and base lines, and the dominant vertical direction of the character strokes. The rectification parameters for each text line are computed from these characteristics. Each text line is then rectified independently and sent to an OCR engine.

Figure 6:
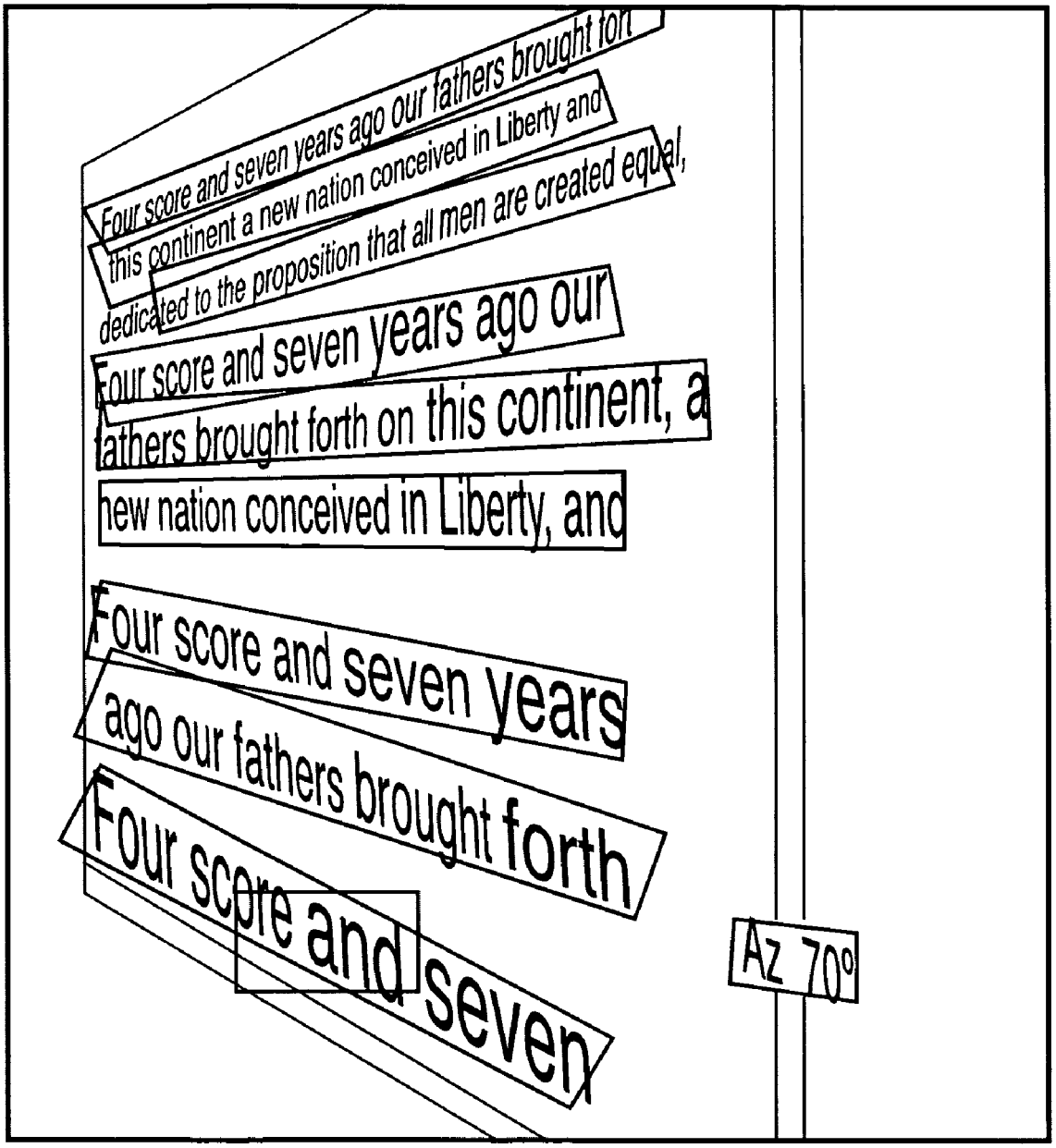
FIG. 6 illustrates a test image of a poster containing text that was captured at an azimuth angle of 70 degrees.

FIG. 6 illustrates a test image of a poster containing text that was captured at an azimuth angle of 70 degrees; the rectangles that have been fitted to each detected text line are shown in overlay. (Some of the rectangles do not look to the eye like true rectangles because of the perspective view of the image contents). In one embodiment, computing the best-fitting rectangle for each text line is an expedient way to approximate the location and extent of the text, but the top and bottom of the text are not accurately computed when significant perspective distortion is present.

Figure 7:
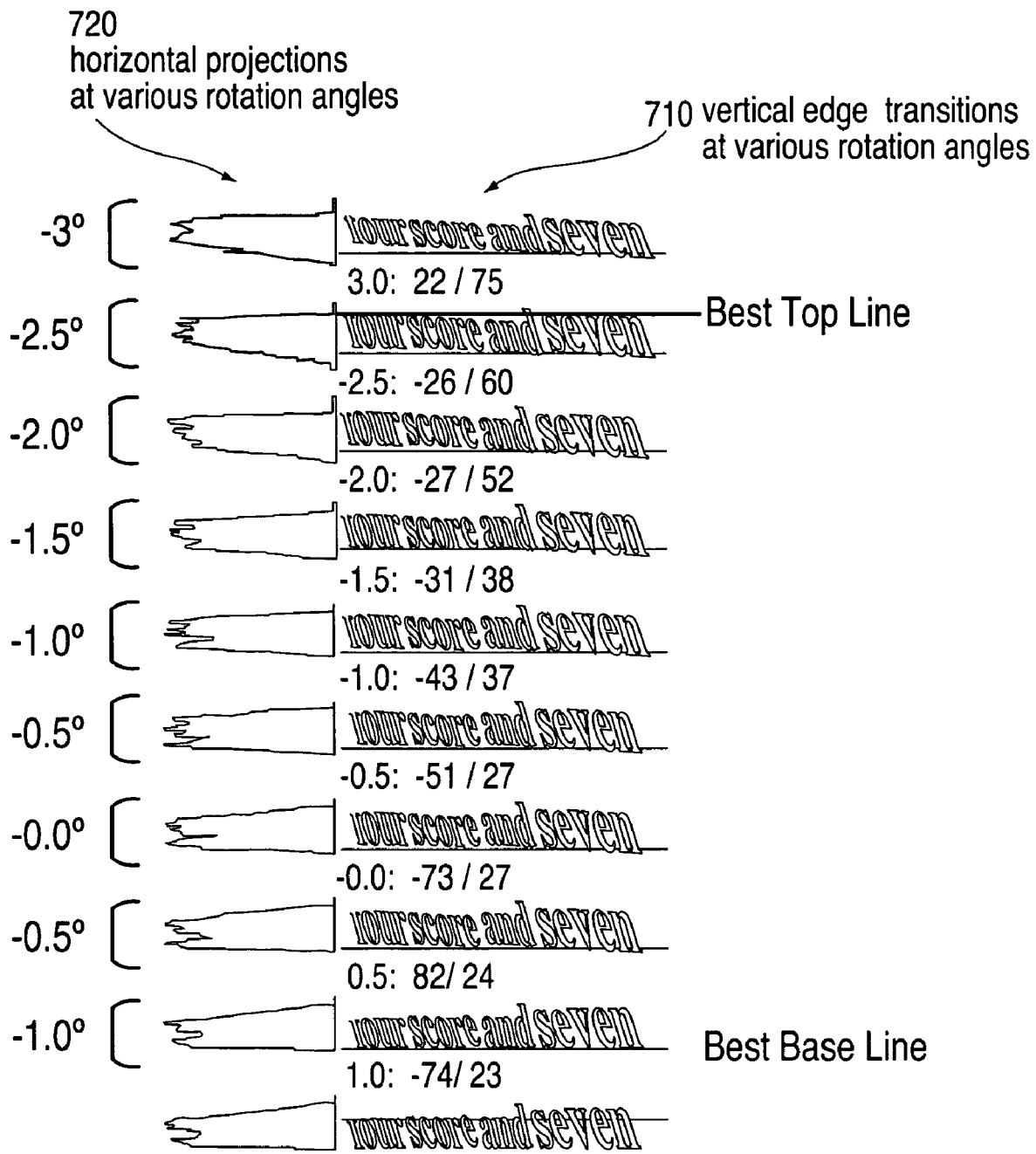
FIG. 7 illustrates a method for estimating top line and bottom line.

In one embodiment, the text region is detected by estimating a top line and base line for each line of text, e.g., by rotating the text line at various angles and then computing a series of horizontal projections 720 over the vertical edge transitions 710 in FIG. 7 (when the text consists of predominantly lower-case characters, the "top" line actually corresponds to the "midline" of the text that touches the tops of lower-case characters, excluding their ascenders). The best estimate of the bottom line should correspond to the rotation angle that yields the steepest slope on the bottom side of the horizontal projection. In one embodiment, to refine the bottom baseline, a bottom edge pixel is located for each column in the initial rectangular bounding box. These bottom edge pixels are then rotated through a series of angles around the original estimated text angle and summed horizontally along each row, P[r]. The angle with the maximum sum of squared projections (sum(P[r]*P[r])) is the baseline angle and the maximum projection is the baseline position. For speed, a binary search is used to locate this maximum projected angle. The process is repeated for the top baseline using only the top edge pixels in each column. FIG. 7 shows an example of this procedure.

Figure 8:
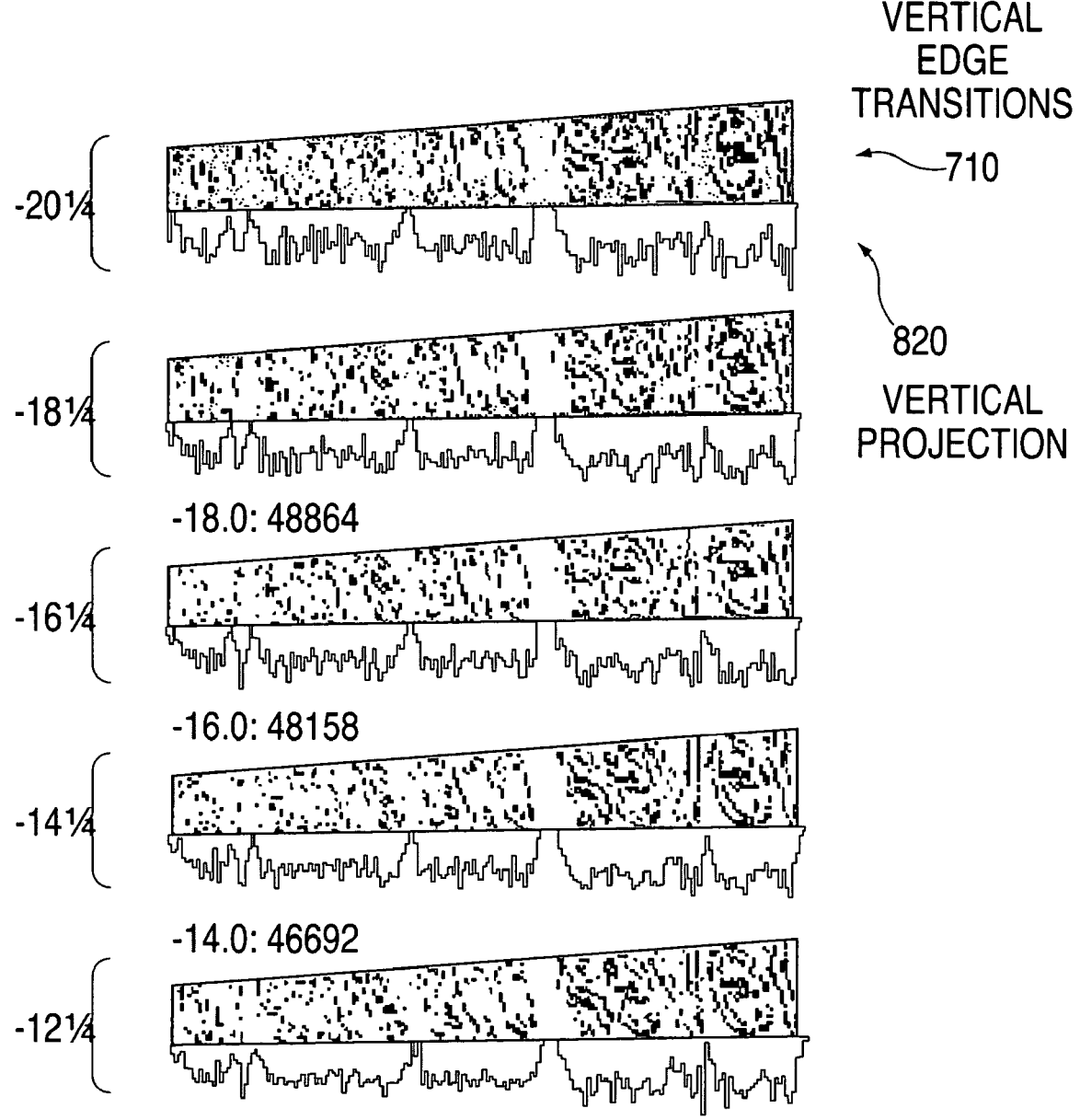
FIG. 8 illustrates an example of shear computation.

It should be noted that in addition to computing two horizontally orientated lines, one would like to find and measure the angles of two vertically orientated lines to use in the computation of the rectification parameters. Unfortunately, an individual line of text does not have much vertical extent, and it is difficult to determine which parts of the text could be used as vertical cues. However, the height of the text is not usually a significant fraction of the depth of the text in three-dimensional space, so that the perspective foreshortening in the Y dimension should be relatively small. Therefore, in the absence of any other reliable vertical cues, one embodiment of the present method computes the dominant vertical direction (shear) of the text by computing a series of vertical projections 820 over the vertical edge transitions after rotation the text line in two-degree increments. The best estimate of the dominant vertical direction should correspond to the angle at which the sum of squares of the vertical projection is a maximum (on the assumption that the projection of true vertical strokes is greatest when they are rotated to a vertical position). FIG. 8 shows an example of shear computation.

Figure 9:
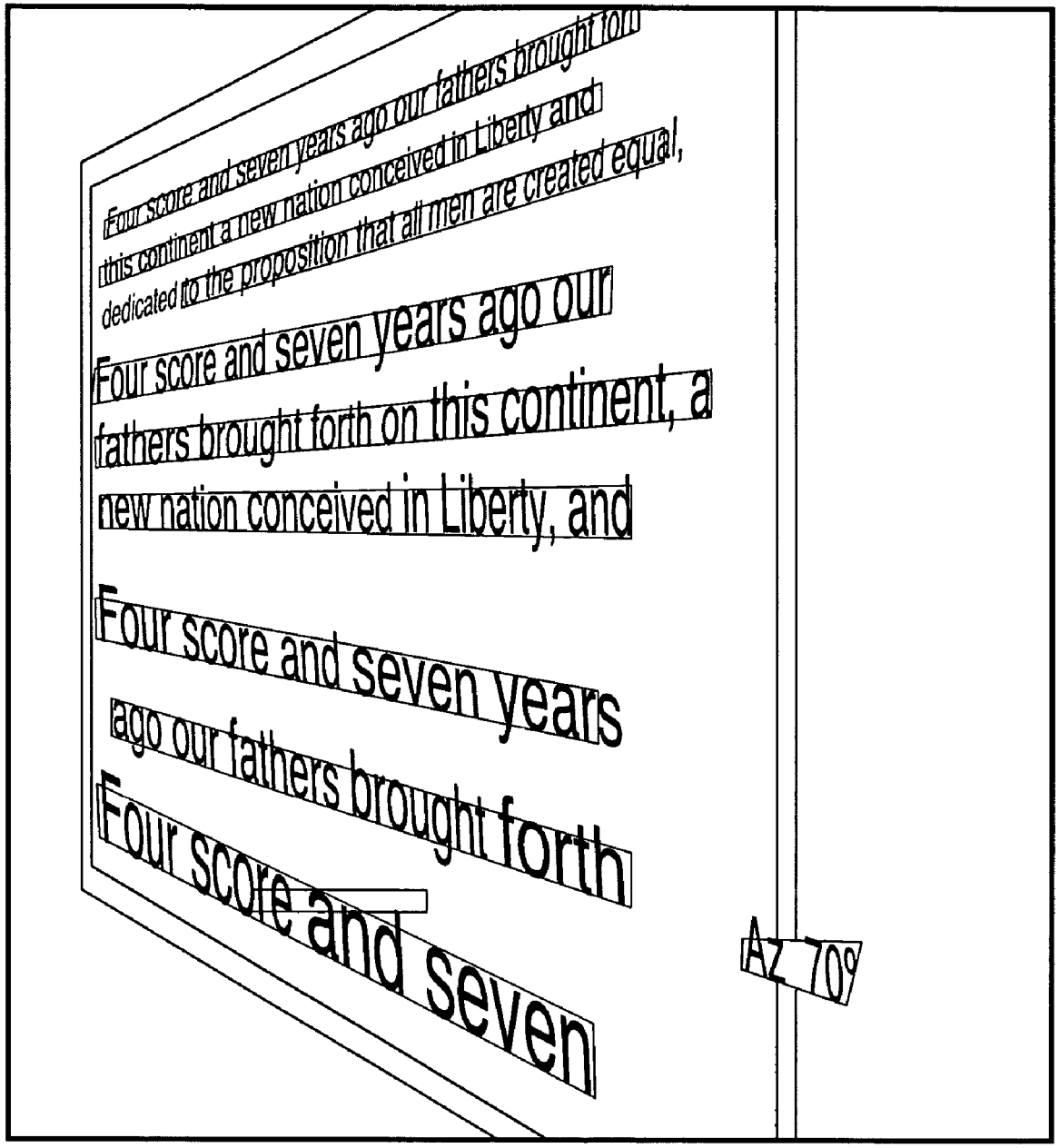
FIG. 9 illustrates refined bounding boxes based on the top and base lines and on the dominant vertical direction.
Figure 10:
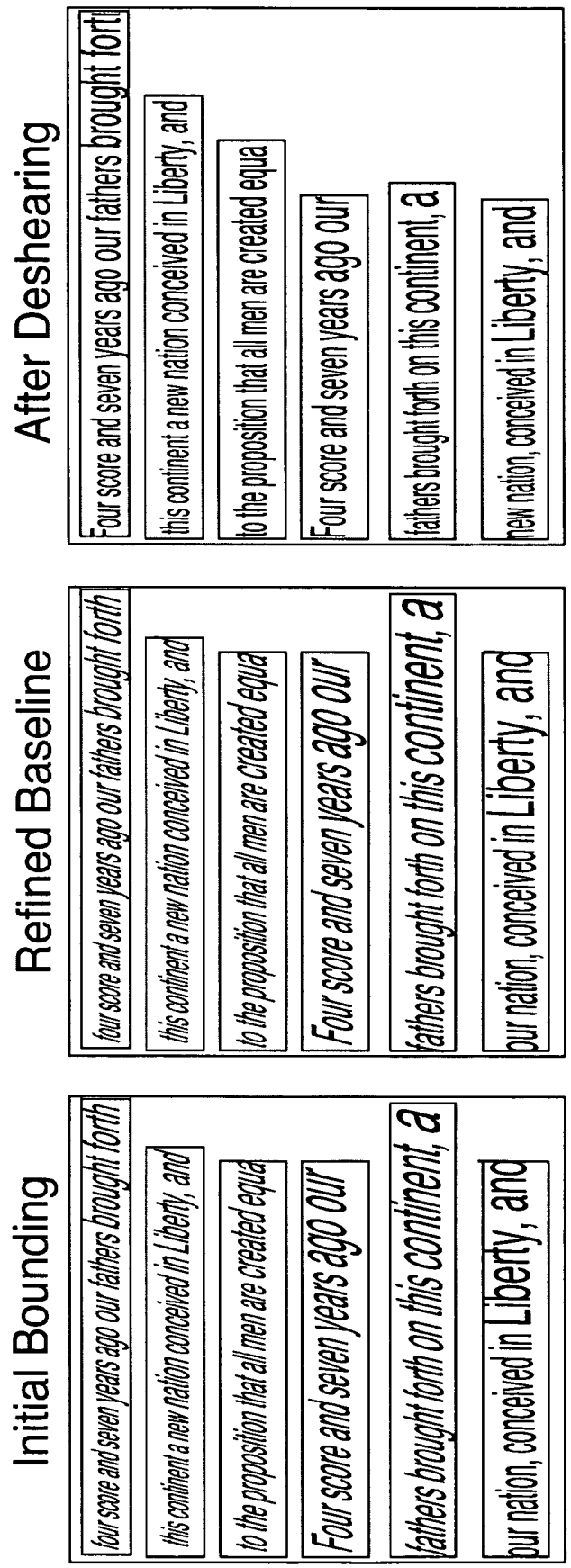
FIG. 10 illustrates the warped text lines after the baseline refinement and de-shearing.

FIG. 9 illustrates the refined bounding boxes based on the top and base lines and on the dominant vertical direction. FIG. 10 illustrates the rectified text lines (a) after the initial rectangular bounding box is de-skewed; (b) after the baseline is refined (without including the top line in the de-warping computation) and then de-skewed; and (c) after the lines are de-sheared.

The transformation used to rectify the image of each text line, $I_j$, occurring in an obliquely viewed image, $O_i$, is a projective transformation, $T_{ij}$, of the text plane. This transformation is described by:

$$m' = Hm \qquad (\text{EQN. 1})$$

where H is a 3×3 matrix that maps the homogeneous coordinates $$m = \begin{bmatrix} x \\ y \\ 1 \end{bmatrix}$$

in $O_i$ to the homogeneous rectified coordinates m' in a rectified image $N_j$, where:

$$m' = EAPm \qquad (\text{EQN. 2})$$

and, m=coordinates in the video image
m'=coordinates in the rectified image
E=Euclidian transformation
A=Affine transformation
P=Projective transformation where:

$$E = \begin{pmatrix} s\cos r & s\sin r & t_x \\ s\sin r & s\cos r & t_y \\ 0 & 0 & 1 \end{pmatrix} A = \begin{pmatrix} 1/b & -a/b & 0 \\ 0 & 1 & 0 \\ 0 & 0 & 1 \end{pmatrix} \text{ and } P = \begin{pmatrix} f & 0 & 0 \\ 0 & f & 0 \\ l_x & l_y & f \end{pmatrix}$$

Figure 11:
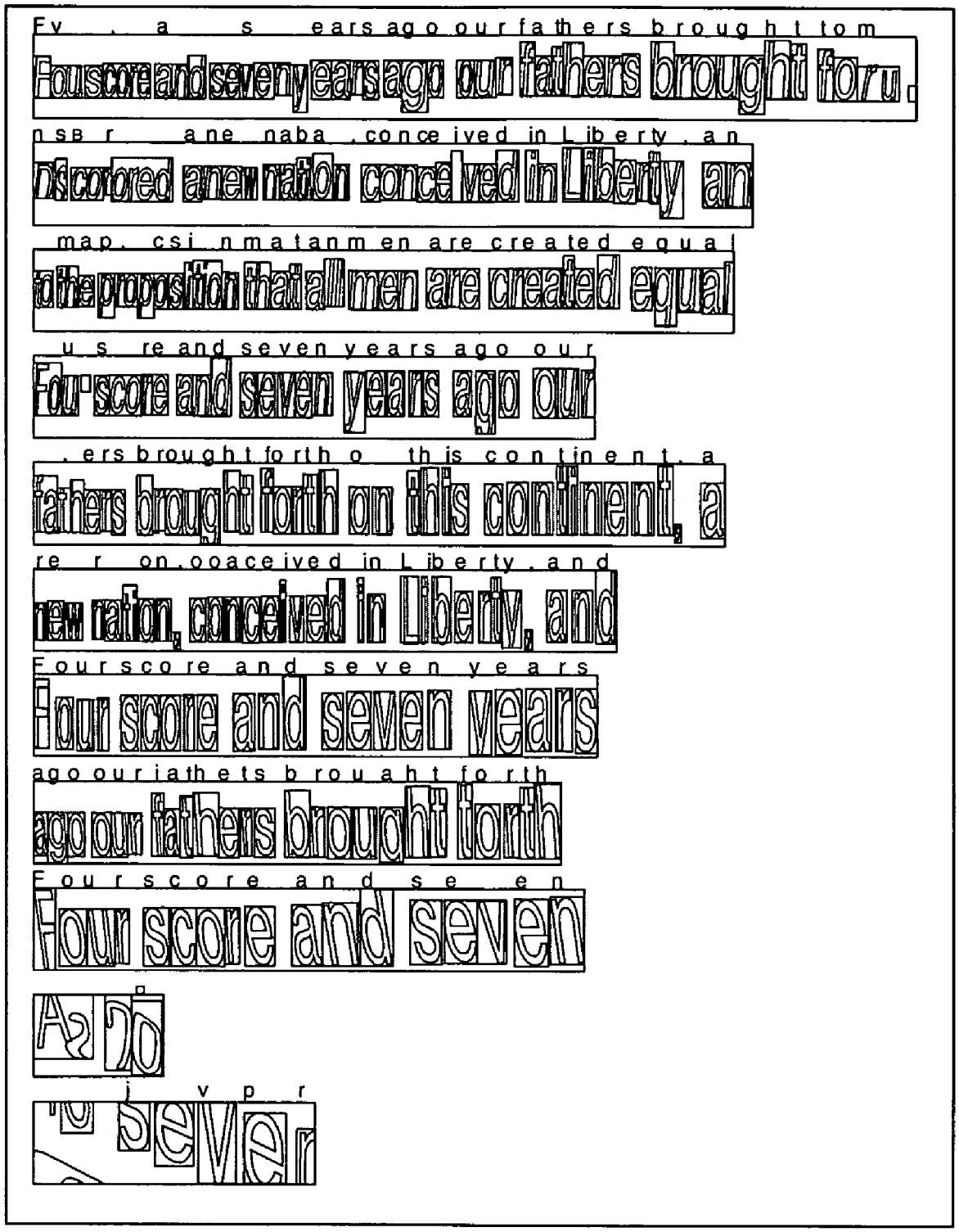
FIG. 11 illustrates a 70 degree azimuth test image, with the recognition results overlaid on the normalized image.

The horizontal and vertical vanishing points are mapped to the points at infinity in the horizontal and vertical directions. This process takes care of the perspective foreshortening in both directions, as well as the skew and rotation. The remaining four degrees of freedom correspond to the origin and scale factors that place the line in the rectified image $N_j$. The image $N_j$, which contains all of the rectified lines from image $O_i$, is then sent through the OCR process. FIG. 11 shows, for the 70 degree azimuth test image, with the recognition results overlaid on the rectified image.

Figure 12:
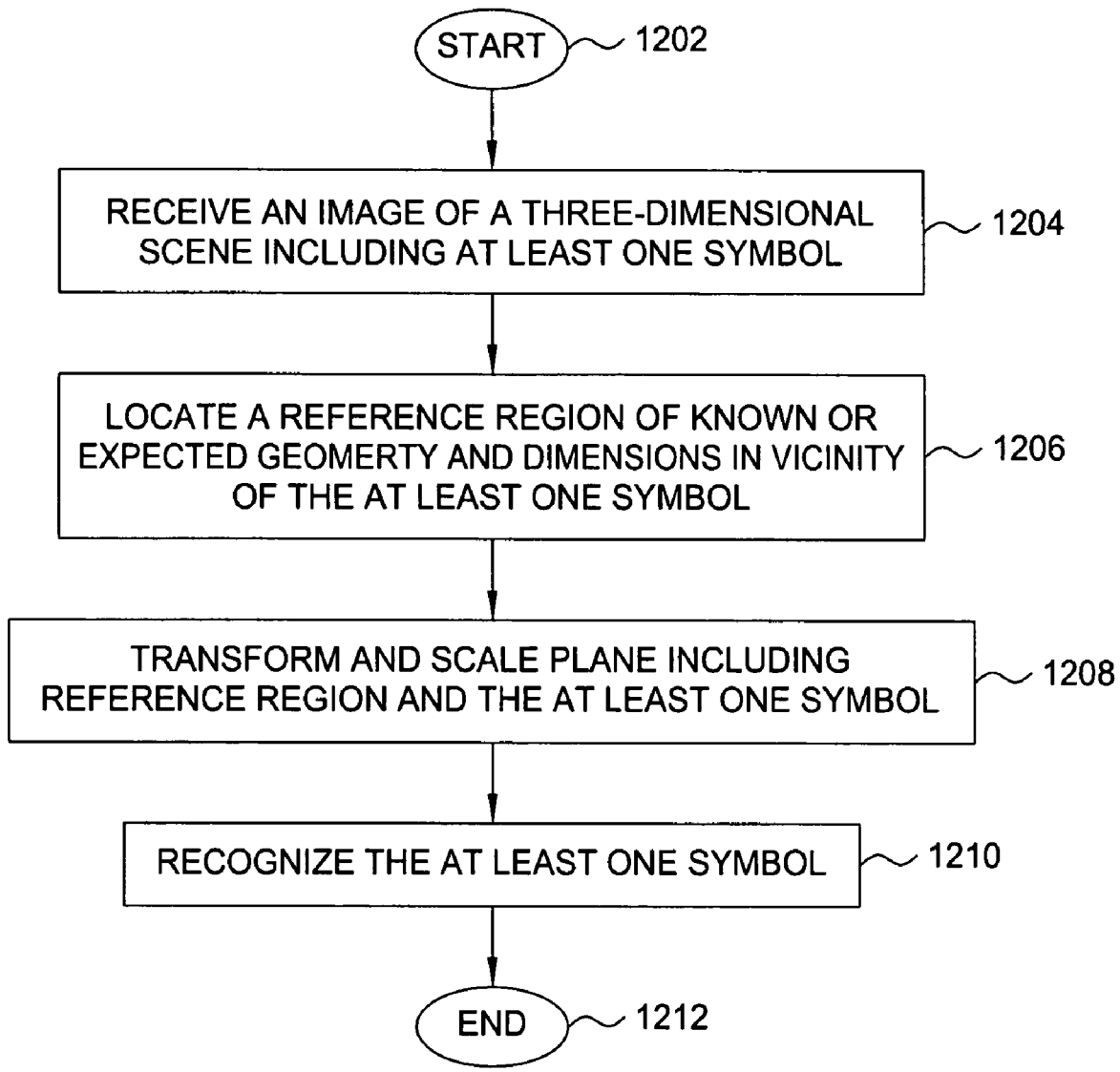
FIG. 12 is a flow diagram illustrating a second embodiment of a method for text recognition and extraction in accordance with the present invention.

FIG. 12 is a flow diagram illustrating a second embodiment of a method 1200 for text recognition and extraction in accordance with the present invention. Specifically, the method 1200 may be implemented in the text recognition device 100 to recognize target objects including symbols (e.g., logos, insignia, emblems and the like), for example as found on automobiles, business cards, official stationery, identification cards (e.g., driver's licenses) and other objects including co-planar reference regions of known or expected geometry and dimensions, along with at least four easily detectable correspondence points within that geometry. For example, security personnel working with a captured video or still image of an automobile including the automobile's license plate and a manufacturer's insignia may implement the present invention in order to obtain more detailed information about the automobile. By using the license plate, which is assumed to have a rectangular geometry and approximately standard or known dimensions, as a reference point to guide rectification of an image plane including the license plate, images of the insignia (and other symbols) in the plane of the license plate may likewise be rectified in a manner that compensates for perspective distortion, rotation and scaling and thereby facilitates recognition.

Thus, the method 1200 is designed for detecting and rectifying an image plane including at least one reference region representing an image of an object of approximately known or expected (e.g., "standard") geometry and dimensions, along with at least four easily detectable correspondence points within that geometry, in order to aid in the rectification of images of target objects also lying within the image plane. The text recognition device 100 of FIG. 1 employing the method 1200 can accept a captured imagery of a three-dimensional scene including a reference object and a co-planar target object. It should be noted that the term "captured imagery" in the present application may encompass, in part or in whole, a single still image or video frame, and/or a sequence of still images or video frames.

Method 1200 starts in step 1202 and proceeds to step 1204, where an image or an image sequence (e.g., video) of a three-dimensional scene including at least one target object (e.g., a symbol, text or other object to be recognized) is received. For example, the three-dimensional scene might include the front or back of an automobile, where the target object is an automobile manufacturer insignia located on the automobile. In another example, the three-dimensional scene might include a business card, where the target object is a corporate logo located on the business card. In one embodiment, the image or image sequence is received directly via conventional image-capturing equipment (e.g., image capturing sensor 116 of the device 100). Alternatively, the image or image sequence is a previously captured image or image sequence retrieved from a storage device (e.g., storage device 111).

In step 1206, the method 1200 locates a reference region within the image in the vicinity (e.g., in a common plane) of at least one target object, where the reference region represents an image of a reference object. In one embodiment, the reference object is an object of known or expected (e.g., standard) geometry and dimensions and/or characteristics, along with at least four easily detectable correspondence points within that geometry. For example, if the image includes the front or back of an automobile, the reference object could be the automobile's license plate, which typically lies in the same plane as the manufacturer's insignia and will typically have standard geometry and dimensions (e.g., at least within the United States). Alternatively, if the image includes a business card, the business card itself (or text regions on the business card, e.g., bounded by quadrilaterals as described above) could be the reference object, since the corporate logo will typically appear on the business card surface and since business cards have roughly standard geometry and dimensions.

In one embodiment, the method 1200 implements known methods for locating objects that are substantially quadrilateral in shape within an image. For example, methods currently exist in the art for locating automobile license plates in an image. In one embodiment, a license plate location method that is insensitive to illumination and/or pose is implemented. In another embodiment, the method 200 described above for detecting and rectifying text regions of an image could be implemented to rectify a plane of a business card or other document that contains both text and symbols.

Once the reference region has been located, the method 1200 proceeds to step 1208 and rectifies (i.e., transforms, rotates and scales) the image plane including the reference region and the target object's image. In one embodiment, the method 1200 locates a bounding quadrilateral of the reference region, and then computes the full (e.g., eight degrees of freedom) projective transformation of this bounding quadrilateral, as described above with reference to FIGS. 9-11. This projective transformation performed on the reference region allows the entire image plane in which the reference region lies (which also includes the target object's image) to be appropriately rectified.

For example, consider a reference region that is an automobile license plate. In general, only the imaged coordinates of points (m) are known, and the true world coordinates (m') are unknown. However, using domain specific knowledge, such as the standard geometry and dimensions of an automobile license plate (e.g., approximately six inches by twelve inches), true world coordinates can be assigned to certain points in the received image.

In this embodiment, the x and y image coordinates of the four corners of the license plate are mapped to a plane in the true world, with the origin of the plane at the bottom left corner of the license plate, the x axis extending from the bottom left corner to the bottom right corner of the license plate, and the y axis extending from the bottom left corner to the top left corner of the license plate. Since the true dimensions of the license plate are assumed to be known (e.g., as standard license plate dimensions), the coordinates of the four corners of the license plate in the true world frame are thus defined (e.g., with an arbitrary scale factor). An arbitrary scaling constant, η, is also chosen and remains constant for all observed objects in the image. Thus, given the designated scaling constant, the origin and the x and y axes, the mapping of the coordinates of the four corners of the license plate in the image plane to the true world plane represents the eight equations discussed above, which may then be solved for the eight unknowns of the projective transformation matrix between the image and true world planes.

In one embodiment, the transformation that is discussed above with regard to the rectification of lines of text (e.g., as embodied in EQNs. 1 and 2) can be applied to map the observed or imaged coordinates of the reference region to rectified or true world coordinates. As discussed above, the transformation matrix, H, has eight degrees of freedom; therefore, to solve for the transformation H, the true world (m') and imaged (m) coordinates of at least four points (no three or more of which are co-linear) of the reference region are needed. Thus, given EQN. 1, $$m' = Hm$$

$$\therefore m'm^T = Hmm^T$$

$$\therefore m'm^T(mm^T)^{-1} = Hmm^T(mm^T)^{-1} = H \quad \text{(EQN. 3)}$$

Thus, given the true world coordinates m' and the imaged coordinates m of the four corners of a standard six inch by twelve inch license plate, EQN. 3 can be solved for the transform H, where $$m = \begin{bmatrix} x_{TL} & x_{TR} & x_{BR} & x_{BL} \\ y_{TL} & y_{TR} & y_{BR} & y_{BL} \\ 1 & 1 & 1 & 1 \end{bmatrix} \quad \text{(EQN. 4a)}$$

and $$m' = \begin{bmatrix} 0 & 12\eta & 12\eta & 0 \\ 6\eta & 6\eta & 0 & 0 \\ 1 & 1 & 1 & 1 \end{bmatrix} \quad \text{(EQN. 4b)}$$

where the subscripts TL designate the top left corner of the license plate, the subscripts TR designate the top right corner of the license plate, the subscripts BR designate the bottom right corner of the license plate and the subscripts BL designate the bottom left corner of the license plate.

Once the transform H is computed, H can be used to "warp" or transform the entire observed image from the image plane to the true world plane (where H is valid only for those objects that lie in the same plane as the license plate, e.g., the rear plane of the automobile)

Once the image plane including the reference region and the at least one target object image has been rectified, the method 1200 proceeds to step 1210 and recognizes the at least one target object, for example using known recognition techniques (such as character recognition, logo recognition or other recognition techniques designed for two-dimensional planar patterns). The method 1200 then terminates in step 1212.

FIGS. 13a-13c illustrate example scales and orientations of the rear plane of an automobile, e.g., including a license plate and a manufacturer's insignia. As illustrated, the perspective distortion, rotation and the distance of the automobile from the camera will significantly alter the shape and size of the manufacturer's insignia. FIGS. 14a-14c illustrate the manufacturer logos, in their imaged original orientations, corresponding to the rear planes of the automobile depicted in FIGS. 13a-13c. FIGS. 15a-15c illustrate the corresponding results obtained when applying the method 1200 to recognize the manufacturer insignia on the rear plane of the automobile depicted in FIGS. 13a-13c. As illustrated in FIGS. 15a-15c, by applying a projective transformation to the rear plane license plate and using the bounding quadrilateral of the license plate as a reference region to guide the transformation, substantially uniform (e.g., in terms of size, proportion and orientation) results for rectification of the manufacturer's logo can be obtained. Thus, the make and/or model of the automobile depicted in FIGS. 13a-c can be identified.

Thus, the present invention enables the recognition of symbols and other target objects that may not be easily rectified using known recognition techniques. By applying a projective transformation to a reference region lying in the same plane as the target object, where the reference region is known or assumed to have certain dimensions in the real world, the entire plane, including the target object, can be rectified to compensate for distortion, facilitating recognition of the target object.

Although the recognition techniques discussed herein have been described within the exemplary contexts of symbols such as automobile manufacturer insignia (e.g., where the reference region is a license plate) and corporate logos (e.g., where the reference region is a business card or other document), those skilled in the art will appreciate that the present invention may be implemented to identify typically hard to recognize target objects in any imagery including a reference region of approximately known or assumed dimensions, where a planar relationship between the target object and the reference region is known.

The teachings of the present invention have been shown and described in detail herein, those skilled in the art can readily devise many other varied embodiments that still incorporate these teachings.

What is claimed is:

1. Method for rectifying at least one target object in a captured imagery, said method comprising:
    using a processor to perform steps comprising:
        locating a reference region lying in a common plane with an image of said at least one target object, said reference region representing an image of a reference object that is defined by a bounding shape having geometry and dimensions that are known to said processor, where said image of said at least one target object lies outside of said bounding shape; and
        rectifying an image of said common plane in accordance with said geometry and dimensions of said bounding shape.

2. The method of claim 1, wherein said rectifying is performed in three dimensions.

3. The method of claim 2, wherein said rectifying comprises:
    applying a projective transformation to said image of said common plane.

4. The method of claim 1, further comprising:
    recognizing said at least one target object in said rectified image of said common plane.

5. The method of claim 4, wherein said recognizing comprises:
    applying image recognition processing to said rectified image to recognize said at least one target object in the captured imagery.

6. The method of claim 1, wherein said reference object is substantially quadrilateral in shape.

7. The method of claim 6, wherein said reference object is an automobile license plate.

8. The method of claim 6, wherein said reference object is a business card.

9. The method of claim 6, wherein said reference object is an identification card.

10. The method of claim 1, wherein said common plane is orientated at an oblique angle relative to an optical axis of a device used to capture said captured imagery.

11. A computer readable medium containing an executable program for rectifying at least one target object in a captured imagery, where the program performs steps of:
    locating a reference region lying in a common plane with an image of said at least one target object, said reference region representing an image of a reference object that is defined by a bounding shape having geometry and dimensions that are known to a processor, where said image of said at least one target object lies outside of said bounding shape; and
    rectifying an image of said common plane in accordance with said geometry and dimensions of said bounding shape.

12. The computer readable medium of claim 11, wherein said rectifying is performed in three dimensions.

13. The computer readable medium of claim 12, wherein said rectifying comprises:
    applying a projective transformation to said image of said common plane.

14. The computer readable medium of claim 11, further comprising:
    recognizing said at least one target object in said rectified image of said common plane.

15. The computer readable medium of claim 14, wherein said recognizing comprises:
    applying image recognition processing to said rectified image to recognize said at least one target object in the captured imagery.

16. The computer readable medium of claim 11, wherein said reference object is substantially quadrilateral in shape.

17. The computer readable medium of claim 16, wherein said reference object is an automobile license plate.

18. The computer readable medium of claim 16, wherein said reference object is a business card.

19. The computer readable medium of claim 16, wherein said reference object is an identification card.

20. Apparatus for rectifying at least one target object in a captured imagery, said apparatus comprising:
    means for locating a reference region lying in a common plane with an image of said at least one target object, said reference region representing an image of a reference object that is defined by a bounding shape having geometry and dimensions that are known to said apparatus, where said image of said at least one target object lies outside of said bounding shape; and
    means for rectifying an image of said common plane in accordance with said geometry and dimensions of said bounding shape.

21. The apparatus of claim 20, wherein said means for rectifying rectifies said image of said common plane in three dimensions.

22. Method for rectifying at least one target object in a captured imagery, said method comprising:
    using a processor to perform steps comprising:
        locating a reference region lying in a common plane with an image of said at least one target object, said reference region representing an image of a reference object that is distinct from said image of said at least one target object and has geometry and dimensions that are known to the processor; and
        rectifying along three axes an image of said common plane in accordance with said geometry and dimensions.

23. The method of claim 22, wherein said image of said reference object is defined by a bounding shape, and said image of said at least one target object lies outside of said bounding shape.

24. The method of claim 22, wherein said common plane is orientated at an oblique angle relative to an optical axis of a device used to capture said captured imagery.

* * * * *